United States Patent [19]

Saleeb et al.

[11] Patent Number: 4,552,767

[45] Date of Patent: Nov. 12, 1985

[54] METHOD OF PACKAGING COFFEE WITH CARBON DIOXIDE SORBENT

[75] Inventors: Fouad Z. Saleeb; Bary L. Zeller, both of Pleasantville, N.Y.

[73] Assignee: General Foods Corporation, White Plains, N.Y.

[21] Appl. No.: 655,194

[22] Filed: Sep. 27, 1984

[51] Int. Cl.$^4$ ............. B65B 31/02; B65D 77/24; B65D 81/20; B65D 90/32

[52] U.S. Cl. ................. 426/395; 426/124; 426/131; 426/398; 426/410; 426/419; 426/397; 423/230; 502/400; 252/192

[58] Field of Search ............. 426/124, 118, 395, 397, 426/398, 418, 419, 131, 410; 502/340, 400; 252/190, 192; 423/230; 55/DIG. 33

[56] References Cited

U.S. PATENT DOCUMENTS

| | | | |
|---|---|---|---|
| 1,333,524 | 3/1920 | Wilson | 252/192 |
| 1,441,696 | 1/1923 | McNeil | 252/192 |
| 2,187,688 | 1/1940 | Hopkins | 426/395 |
| 2,225,810 | 12/1940 | Waters | 426/395 |
| 2,430,663 | 11/1947 | Behrman | 426/124 |
| 2,470,214 | 5/1949 | Egan | 252/192 |
| 2,524,162 | 10/1950 | Chavannes et al. | 426/124 |
| 2,838,403 | 6/1958 | Notter | 426/398 |
| 3,419,400 | 12/1968 | Hayhurst et al. | 426/124 |
| 3,545,983 | 12/1970 | Woods | 426/395 |
| 3,670,874 | 6/1972 | Brunner | 426/124 |
| 3,840,680 | 10/1974 | Schmidt et al. | 426/415 |
| 3,847,837 | 11/1974 | Bortta | 502/400 |
| 3,990,872 | 11/1976 | Cullen | 426/415 |
| 4,004,398 | 1/1977 | Larsson et al. | 426/410 |
| 4,069,349 | 1/1978 | Shaw | 426/395 |
| 4,078,356 | 3/1978 | Gallo et al. | 426/410 |
| 4,366,179 | 12/1982 | Nawata et al. | 423/230 |
| 4,407,723 | 10/1983 | MacGregor | 252/190 |
| 4,492,649 | 1/1985 | Cheh et al. | 423/230 |

FOREIGN PATENT DOCUMENTS

| | | | |
|---|---|---|---|
| 925056 | 4/1973 | Canada | 426/124 |
| 691682 | 5/1953 | United Kingdom | 426/419 |
| 1242412 | 8/1971 | United Kingdom | 426/419 |
| 1357475 | 6/1974 | United Kingdom | 426/410 |
| 2035043 | 6/1980 | United Kingdom | 426/124 |

*Primary Examiner*—Steven Weinstein
*Attorney, Agent, or Firm*—Thomas A. Marcoux; Thomas R. Savoie; Daniel J. Donovan

[57] ABSTRACT

A carbon dioxide sorbent is disclosed which comprises calcium hydroxide at a level of from 70 to 95% by weight based upon the total dry weight of the sorbent, sodium hydroxide, potassium hydroxide or admixture thereof at a level of from 5 to 15% by weight, optionally calcium chloride at a level of from 5 to 15% by weight and less than 1.5% moisture. Also disclosed is a method for packaging coffee utilizing the carbon dioxide sorbent.

10 Claims, No Drawings

4,552,767

METHOD OF PACKAGING COFFEE WITH CARBON DIOXIDE SORBENT

TECHNICAL FIELD

This invention relates to a product which has utility as a carbon dioxide sorbent designed to be packaged in combination with a food product to remove carbon dioxide evolved by said food product from the headspace of the food package. The utilization of this invention would obviate or lessen the need for a degassing procedure.

BACKGROUND ART

In the food art, particularly in relation to the packaging of roast and ground coffee and roasted whole beans, it is essential that the foodstuff prior to being packaged undergo a degassing technique. When coffee is packaged in a flexible, plastic-type container without first being degassed, the package will balloon as evolved carbon dioxide is liberated from the coffee and eventually the container will break and its contents will be ruined. Even in the event that the package does not rupture, the evolved gasses will create an expansion of the package that will render the package unattractive from a consumer standpoint.

The food art, in response to this problem has developed a number of degassing procedures. However all the degassing procedures suffer from certain problems. The problems include expensive processing costs, specific problems associated with ingredients such as Robusta coffees which are slow to degas resulting in a limited use level of the ingredient and problems of freshness caused by long holdup periods necessitated by the degassing procedure. Should large quantities of Robusta coffees be included in the coffee formula, a more elaborate degassing procedure is necessary which will amplify the above-mentioned adverse effects. Because of the disadvantages of degassing, there has been a need to circumvent degassing by developing a substance which could be added to the food product to remove the evolved gasses which remain in a food product which has not been degassed prior to packaging.

British Pat. No. 1,579,460 entitled "Oxygen Absorbents" teaches the production of an agent for absorbing or removing oxygen comprising iron and at least one metal halide, characterized in that the iron contains sulfur in an amount of from 0.05 to 5% based on the weight of the iron. This specification and the prior art cited therein center upon the problem of selectively removing oxygen from the atmosphere in which the foodstuffs are packaged, thereby preserving the packaged foodstuffs by preventing oxidation and spoilage.

U.S. Pat. NO. 4,366,179 issued to Nawata et al. entitled "Oxygen And Carbon Dioxide Absorbent And Process For Storing Coffee By Using the Same" teaches an oxygen and carbon dioxide sorbent to be packaged with roast and ground coffee or roasted whole coffee beans, said sorbent comprising a particulate substance wherein the particles of a hydrous alkali substance are covered with separator particles, iron powder and an electrolyte. The hydrous alkali substance is a particulate alkaline earth metal hydroxide impregnated with water or a moisture-conditioning solution, or a particulate carrier of low water solubility which is impregnated with water or a moisture-conditioning solution. The alkaline earth hydroxide is either magnesium hydroxide, calcium hydroxide or barium hydroxide. The iron powder functions to absorb oxygen and the electrolyte is a strong electrolytic inorganic salt, preferably a metal halide. The sorbent requires the presence of water or a moisture-conditioning solution which will adjust the relative humidity so that the equilibrium relative humidity of the resulting sorbent is more than 30% and equal to or less than 100%. Also the sorbent must be wrapped in a gas permeable membrane that prevents the escape of water from within the membrane package.

However, in the coffee art the problem of the removal of carbon dioxide from coffee, which has not been completely degassed prior to packaging, remains a problem for which a satisfactory substitute has not been found even though the art has been seeking ways to avoid the degassing procedure.

DISCLOSURE OF THE INVENTION

This invention relates to a carbon dioxide sorbent which will remove carbon dioxide from the headspace of a packaged foodstuff. The carbon dioxide sorbent is made up of calcium hydroxide in combination with an alkali hydroxide which is either sodium hydroxide or potassium hydroxide. The carbon dioxide sorbent is present in the packaged food product at a level of from 1 to 10 grams of the sorbent per pound of the packaged foodstuff.

The carbon dioxide sorbent of the present invention consists of a combination of calcium hydroxide an alkali hydroxide which is potassium or sodium hydroxide and 1.5% or less water. The carbon dioxide sorbent is prepared by dry blending the calcium hydroxide with the sodium hydroxide, potassium hydroxide or admixture to produce a free-flowing material containing sorbent particles less than 1 mm.

The carbon dioxide sorbent is preferably packaged in combination with roast and ground coffee or roasted whole beans without the addition of moisture in excess of the approximately 2% to 4% moisture content present in these processed food products. This moisture content is equivalent to a relative humidity of approximately 30%. All literature references and prior art known to the present inventors, including the previously discussed patents, mention that some moisture, in addition to the low level present in the foodstuff, is necessary to initiate and maintain the reaction of calcium hydroxide with carbon dioxide. However, in accordance with the instant invention, the sodium or potassium hydroxide which is present at a level of from 5 to 15% by weight of the sorbent, dry basis, will initiate the following chemical reactions:

$$2\ NaOH + CO_2 \rightarrow Na_2CO_3 + H_2O$$

$$2\ KOH + CO_2 \rightarrow K_2CO_3 + H_2O$$

The small amount of water which is generated by this reaction is quite sufficient to partially break the crystalline structure of the calcium hydroxide and initiate the following chemical reaction:

$$Ca(OH)_2 + CO_2 \rightarrow CaCO_3 + H_2O$$

The evolved water generated from the above reaction will help in facilitating the reaction to completion.

The present invention also involves a process for packaging coffee. The process comprises back-flushing roast and ground or roasted whole beans with nitrogen or vacuum packing to remove substantially all of the oxygen present therein, packaging said coffee into a container preferably a flexible container and adding to the coffee contained within said container a carbon dioxide sorbent, said sorbent comprising from 70 to 95% calcium hydroxide from 5% to 15% of an alkali hydroxide which is either sodium hydroxide, potassium hydroxide or admixture of potassium and sodium hydroxide and optionally from 5 to 15% calcium chloride, all ingredients being based upon the total dry weight of the sorbent. In the present process, there is no need for an oxygen sorbent because the backflushing with nitrogen or vacuum packing will remove greater than 90% of the oxygen from the coffee source, preferably greater than 95%. The residual low level of oxygen present in the coffee after backflushing or vacuum packing does not present a problem. The backflushing with nitrogen will last at most only a couple of seconds, usually a second or less. However, neither the backflushing with nitrogen nor the vacuum packing will remove any substantial amount of carbon dioxide.

The utilization of the above process will ensure that the packaged coffee will be of the utmost freshness. In most operations involving the canning of roast and ground coffee, the coffee must degass naturally for periods of time upwards as long as 4 hours. The coffee during this period may possibly undergo oxidative reactions and more importantly loss of freshness notes which will result in a less flavorful coffee when it is perked by the consumer. In addition to the above-mentioned benefits, the process of this invention possesses an economic advantage over the typical vacuum packaging of coffee in metallic tins. However, the process of the present invention can permit the packaging of non-degassed coffee in tin cans of decreased wall strength due to the fact that the sorbent will prevent the building of carbon dioxide.

Fast initial carbon dioxide removal is a prerequisite for a successful carbon dioxide sorbent especially if it is to be used in a vacuum-packaged, roast and ground coffee package. The initial rate of carbon dioxide release from roast and ground coffee is relatively fast and unless the evolved carbon dioxide is removed at approximately the same rate as it is evolved a ballooned coffee bag will be produced. The low level of sodium or potassium hydroxide functions in the sorbent to quickly remove this initially evolved carbon dioxide and furthermore the water produced from this reaction will activate the $Ca(OH)_2$ thus allowing it to absorb further evolved $CO_2$.

The invention can be utilized to absorb carbon dioxide generated by any foodstuff packaged within a closed container, but will have its greatest utilization in the packaging of roast and ground coffee or roasted whole beans in a flexible type package. While the present invention may be utilized with both roast and ground and roasted whole beans, there is a major difference in the rate of release of carbon dioxide from roasted whole beans as compared with roast and ground coffee. The packaged roasted whole beans take several months to degas to a fair extent as compared with less than approximately two weeks for roast and ground coffee. If the moisture-free carbon dioxide sorbent is incorporated with roasted whole beans, since the coffee has a water activity lower than that of the ingredients in the sorbent, any water generated from the sodium or potassium hydroxide reaction will be transferred to the roasted whole beans thereby leaving the sorbent in contact with very little moisture to initiate and maintain the calcium hydroxide reaction. In this state, the sorbent is unable to pick up all of the carbon dioxide which will evolve from the roasted whole beans.

In order to overcome this problem, optionally a water holding material may be added to the sorbent especially if the sorbent is to be packaged with roasted whole beans. The water holding material must be fairly hygroscopic and will ideally extract moisture and form a saturated solution possessing a water activity close to that of the foodstuff to which it is packaged in combination with. In other words if a small amount of the moisture holding material is incorporated with the sorbent a small but effective moisture level is always maintained in the sorbent once the alkali hydroxide has reacted with the $CO_2$ to produce the water which will drive the $Ca(OH)_2$ reaction. Also, as the reaction of $Ca(OH)_2$ with $CO_2$ slows down, due to a slower release of $CO_2$, the water holding material keeps water in the presence of the $Ca(OH)_2$ to keep its structure open. In this open state, the $Ca(OH)_2$ is able to react with any evolved $CO_2$.

Examples of water holding materials which are effective in the present invention include calcium chloride, sodium chloride, potassium, nitrate, sodium nitrate in their anhydrous forms or containing water of crystallization. Additionally combinations of these compounds may be utilized. The preferred water holding material is calcium chloride. Preferably the level of calcium chloride incorporated will range from 5 to 10% by weight of the sorbent. A saturated calcium chloride solution has a water activity very close to that of the roasted coffee beans to which it will be packaged in combination. Since calcium chloride is very water soluble and has a high affinity for water, any moisture generated by the chemical reaction of either the alkali hydroxide or the calcium hydroxide with the carbon dioxide will be retained by the calcium chloride and would ultimately lead to the formation of a saturated aqueous phase dispersed in the alkaline earth hydroxide powder. This invisibly-dispersed phase will contribute to a partial molecular dissolution of the calcium hydroxide and ensure a steady chemical uptake of carbon dioxide whenever it is released from the foodstuff, even if this release of carbon dioxide takes place several months after the whole coffee beans have been packaged.

The level of sodium hydroxide, potassium hydroxide or admixture of the two present in the sorbent will vary from 5 to 15%, preferably from 10 to 15% based on the total dry weight of the sorbent. These materials will react quickly with any evolved carbon dioxide to both rid the package of the initial evolved gases and produce water as a byproduct of the reaction. The water thus generated will be used to drive the chemical reaction of the calcium hydroxide with the evolved carbon dioxide. However, while the sodium and/or potassium hydroxide will react quickly with any evolved carbon dioxide it can only be added up to a maximum level of 15% because the reaction products, either sodium or potassium carbonates are prone to develop off-flavors. However at the levels at or below 15% of the total sorbent, this poses no appreciable flavor problem. The sorbent as a whole may diminish the headspace aroma of the packaged foodstuff. This may be noticeable when the consumer opens the food product. The aroma intensity may be less but the perked coffee will taste the same as conventionally packaged coffee would taste.

The sorbent may be incorporated into the food package in a multitude of ways. It is best to segregate the sorbent materials from the food product as by packaging the sorbent in an envelope or bag. The preferred method is to put the carbon dioxide sorbent in a $CO_2/H_2O$ permeable membrane and attach the permeable membrane containing the sorbent, by heat seal or by gluing to the inside wall of the flexible plastic package. The packaging of the carbon dioxide sorbent in a water vapor permeable envelope will allow the water generated as a reaction product to be transferred to the coffee to maintain a constant relative humidity throughout.

Roasted coffee contains typically between 2-4% moisture and has an equilibrum relative humidity of approximately 30%. Although the exact mechanism of degradation is not understood, it is well known that the quality of coffee aroma in a closed coffee package decreases in the presence of high humidity. The quality of the roasted coffee aroma must be closely guarded in light of the fact that the consumer regards the freshness and overall quality of the coffee product to be directly related to the headspace aroma character.

As a result, the ideal $CO_2$ absorbent system for application to coffee products would not cause a condition of altered relative humidity, even locally within the sorbent package, for any substantial period of time. Also, the amount of water present as moisture in the $CO_2$ absorbent material would best be kept to a minimum since it is eventually transferred to the coffee. This is in addition to any water generated as reaction by-products of the $CO_2$ sorbing reaction(s). It is inevitable that the $CO_2$ sorbent eventually becomes dehydrated after it has served its purpose due to the low water activity and proportionally greater mass of the coffee with which it is packaged.

If the $CO_2$ absorbent were formulated to have a lower water activity than that of coffee, it would attract enough moisture from the coffee to form a liquid solution. This is a condition both potentially hazardous and unattractive to the consumer and would surely decrease the effectiveness of the $CO_2$ sorbing mechanism. A paradox exists in that although the $CO_2$ sorbent should remain as dry as possible throughout its useful lifetime to safeguard against potential deleterious effects to the coffee product, a certain amount of moisture must be present in the $CO_2$ sorbent in order to activate the main ingredient, $Ca(OH)_2$, to initiate reaction with $CO_2$. The present invention offers a partial solution to this dilemma.

The sorbent of the present invention is formulated to contain a level of moisture equal to or less than 1.5% by weight based upon the total weight of the sorbent. Preferably when sodium hydroxide is utilized, the moisture content of the sorbent is between 0% to about 0.5% by weight based upon the total weight of the sorbent. However, when potassium hydroxide is incorporated, the moisture range may be higher than the 0.5% since it is difficult to obtain KOH in a very dry form due to its highly deliquescent nature.

This very low moisture is insufficient to allow the major and less expensive ingredient, $Ca(OH)_2$, to react with $CO_2$. Because it is undesirable to attract water from the coffee in order to activate the $Ca(OH)_2$ for reasons already explained, a water-generating agent must be added to the $Ca(OH)_2$. NaOH is an ideal additive due to the fact that it not only generates moisture, but does so by chemical reaction with $CO_2$. It, unlike $Ca(OH)_2$, is active even in an anhydrous form and able to sorb $CO_2$ in the absence of moisture.

It can be seen that the NaOH serves a dual purpose in the sorbent product: it contributes directly to $CO_2$ removal and generates sufficient moisture, if added in the proper amount, to activate the $CO_2$-sorbing mechanism of the $Ca(OH)_2$. As $Ca(OH)_2$ reacts with $CO_2$, it also creates water as a by-product and causes the water activity to gradually rise in the $CO_2$ absorbent mixture above that of the coffee. Because this is usually a relatively slow process and essentially no significant amount of moisture is present in the absorbent formulation initially, the excess and unneeded water can be transferred to the coffee as it is generated without accumulating in the sorbent to appreciable levels. Thus, the possibility of forming a localized region of high humidity is diminished.

The carbon dioxide sorbent of the present invention can be used in combination with a vacuum packaged coffee or a nitrogen flush atmospheric pressure coffee package. Vacuum-packed coffee in flexible bags are characterized by having void volumes that are appreciably less than that available in a metal can. Measurements showed that, on the average, one pound (454 g.) of roasted and ground coffee in a plastic bag has a void volume of about 400 cc. In other words, for a given $CO_2$ release from a particular roasted coffee, a significantly higher container pressure will be observed with a flexible bag versus a can. Consequently, either a highly degassed coffee or a $CO_2$ scavenger have to be used particularly with a flexible bag. Such bags show ballooning if the container pressure is slightly above the atmospheric value. Coffee in an evacuated flexible bag has the feel of a collapsed hard brick-type structure. As the degassing proceeds, and the initial vacuum is reduced, a pliable but still wrinkled bag is observed at a bag internal pressure of about ½" vacuum. Ballooning occurs above 1 atmosphere.

In many instances it is desireable to pack coffee (roast and ground or whole beans) in flexible bags but with no vacuum applied to avoid the brick-type appearance and to provide the coffee feel (touch) to consumers. In these instances the void to coffee weight is irrelevant but the only requirement is that no net bag volume increase is allowed. In other words the $CO_2$ sorbent should remove all the released gas from the coffee otherwise a ballooned appearance will result.

The following Examples are offered to further illustrate but not to limit the invention disclosed herein.

The first three Examples illustrate actual methods employed to prepare the carbon dioxide sorbents of the present invention. A kitchen-size (40 ounce capacity) commercial Waring Blender was used in our work. All chemical reagents were "Analyzed ® Reagents" manufactured by J. T. Baker Chemical Co., (Phillipsburg, NJ).

EXAMPLE 1

500 g of NaOH pellets were placed in a blender jar and then covered. The blender was operated at medium speed for five minutes in order to obtain a uniformly-ground sample. The ground NaOH powder was quickly passed through a 20 mesh sieve to remove any pellet fragments which were insufficiently reduced in size. The sieved material was stored in a tightly closed glass jar for use in $CO_2$ sorbent preparation while the small amount of fragments recovered was similarly stored for future grinding.

50 g of the above-mentioned NaOH powder was added to an empty blender jar along with 450 g of Ca(OH)$_2$ powder and then covered. The blender was operated at high speed for five minutes to sufficiently mix the two ingredients. The contents of the blender jar were transferred to a glass jar for storage and protection from atmospheric moisture. The moisture level of this dry mix sorbent material was measured and found to be 0.2%/wt (determined by weight loss after 24 hours at 210° F. and 25" vacuum in a closed oven). The CO$_2$ sorbent (10% NaOH/90% Ca(OH)$_2$) was a free-flowing powder, and as can be seen in Table 1, it is very reative toward CO$_2$ despite its very low moisture content.

EXAMPLE 2

40 g of ground NaOH prepared in the previous Example was placed in a blender jar containing 40 g of granular CaCl$_2$ dihydrate and 320 g of Ca(OH)$_2$ powder and then covered. The blender was allowed to operate for five minutes at high speed to produce a homogeneously mixed CO$_2$ absorbent material in fine powder form. The cover was removed from the blender jar and the contents poured into a glass jar which was covered and stored for use. The moisture content was found to be 0.5% when measured by the method revealed in Example 1. Table 1 illustrates the reactivity of this powdered CO$_2$ sorbent (10% NaOH/10% CaCl$_2$.2H$_2$O/80% Ca(OH)$_2$.

EXAMPLE 3

100 g of the 10% NaOH/90% Ca(OH)$_2$ sorbent product produced in Example 1 was added to a glass jar (16 ounce capacity) containing 100 g of Ca(OH)$_2$ powder. The contents were stirred by hand with a plastic spoon for five minutes and the jar was then covered. The closed jar was tumbled and shaken by hand for an additional five minutes in order to insure a homogenous mixture of 5% NaOH/95% Ca(OH)$_2$. The sorbent product was found to contain 0.8% moisture when analyzed by the method of Example 1 and the reactivity toward CO$_2$ can be seen in Table 1.

EXAMPLE 4

In order to assess the utility of CO$_2$ absorbents of the present invention, they were experimentally tested along with samples of commercially available CO$_2$ absorbents. The CO$_2$ uptake rate was measured at 30° C. and 380 mm Hg CO$_2$ (99.8% purity) for each sample studied. All absorbents were evaluated containing moisture as prepared or as received. In addition, each fresh, unreacted substance was dried at about 200° F. and about 25" Hg vacuum for about 20 hours in a vacuum oven; the CO$_2$ uptake rate of these was measured as those above.

A summary of the results is illustrated in the attached Tables below for various sorbents prepared according to the dry mix disclosed method of the present invention; soda lime manufactured by Mallinckrodt; and Sodasorb ® obtained from Dewey and Almy Chemical Company. The utility of the sorbents of the present invention which contain levels of moisture less than 1.5% in sorbing CO$_2$ should be readily seen from this data. Also, in order to exemplify the advantage of dry blending technique utilized to produce these sorbents, several CO$_2$ absorbent materials were prepared using the well-known paste formation/drying/grinding/sieving process utilizing similar chemical ingredients and proportions utilized in preparing the sorbent of the present invention. The experimental results obtained from these substances serve to illustrate the advantages of the low moisture/dry blended CO$_2$ absorbents prepared according to the present invention.

All data presented in Tables 1–3 were measured by the current inventors utilizing the same apparatus for each sorbent sample tested. It consisted of a closed all glass system comprised of four parts: sample-holding tube; mercury manometer; mercury-filled adjustable-volume buret; and CO$_2$ gas reservoir. A circulating water bath was used to maintain the temperature of the buret and sample tube at 30° C.

0.5 g of the sorbent was placed into the sample tube and the evacuated system filled to 380 mm Hg pressure using CO$_2$ from the reservoir. As the sample sorbs CO$_2$, the volume of the buret is adjusted manually and frequently to maintain a 380 mm Hg pressure reading on the manometer. Buret volumes are recorded as a function of time at constant 380 mm Hg CO$_2$ pressure.

Data in Tables 1–3 is expressed as "Cumulative cc CO$_2$ Absorbed/Gram" for the sake of clarity and is equivalent to the 0.5 cc/0.5 g data actually measured (0.5 cc/0.5 g = 1 cc/1 g). The data presented have also been adjusted to compensate for measured system void-volumes using standard methods common to pressure/volume experimentation.

TABLE 1

| Sorbents of the Present Invention | | | | |
|---|---|---|---|---|
| Dry Mix Sorbent | % Moisture | Cumulative cc CO$_2$ Absorbed/Gram | | |
| | | 2 hrs | 8 hrs | 24 hrs |
| 5% NaOH/95% Ca(OH)$_2$ | 0.8 | 180 (181) | 248 (250) | 305 (307) |
| 10% NaOH/90% Ca(OH)$_2$ | 0.2 | 228 (228) | 284 (285) | 322 (323) |
| 10% KOH/90% Ca(OH)$_2$ | 1.5 | 303 (306) | 313 (316) | 322 (325) |
| 10% NaOH/10% CaCl$_2$ 2H$_2$O/90% Ca(OH)$_2$ | 0.5 | 194 (195) | 301 (303) | 304 (306) |

Each of the sorbents represented in Table 1 were prepared by adding together the individual ingredients in a blender jar and mixing at high speed for five minutes in the closed blender jar. The percentage moisture was determined by weight loss in a vacuum oven after 24 hours at 210° F. and 25" Hg vacuum. Samples containing CaCl$_2$.2H$_2$O were corrected for loss of water-of-crystallization to determine free-moisture levels.

The numbers in parenthesis are "cumulative cc CO$_2$ absorbed per gram" calculated on a dry basis.

TABLE 2

| Commercial "Paste Process" Sorbents | | | | |
|---|---|---|---|---|
| Dried "Paste Process" Sorbents | % Moisture | Cumulative cc CO$_2$ Absorbed/Gram | | |
| | | 2 hrs | 8 hrs | 24 hrs |
| Soda Lime | 1.9 | 194 (198) | 250 (255) | 272 (277) |
| Soda Sorb | 14.5 | 186 (218) | 244 (285) | 270 (316) |
| 10% NaOH/90% Ca(OH)$_2$ | 0.5 | 28 | 29 | 31 |
| 10% NaOH/10% CaCl$_2$ 2H$_2$H$_2$O/80% Ca(OH)$_2$ | 0.5 | 27 | 40 | 166 (167) |

The last two sorbents presented in Table 2 were prepared by forming a paste in water followed by drying, grinding and sieving. Thereafter they were ground to a fine powder to maximize their surface area and reactivity.

TABLE 3

Sorbents Dried to Less Than 0.1% Moisture

| Sorbent | % Moisture | Cumulative cc $CO_2$ Absorbed Gram | | |
|---|---|---|---|---|
| | | 2 hrs | 8 hrs | 24 hrs |
| Soda Lime | <0.05 | 16 | 17 | 19 |
| Soda Sorb | <0.05 | 15 | 17 | 19 |
| 10% NaOH/90% Ca(OH)$_2$ of the present invention | <0.05 | 162 | 246 | 300 |
| 5% NaOH/95% Ca(OH)$_2$ of the present invention | <0.05 | 24 | 29 | 220 |
| 10% NaOH/10% CaCl$_2$ 2H$_2$O/80% Ca(OH)$_2$ "dry paste process" | <0.05 | 15 | 17 | 18 |
| 10% NaOH/90% Ca(OH)$_2$ "dry paste process" | <0.05 | negligible | negligible | negligible |

Several conclusions may be derived from the data presented in the above Tables. All of the $CO_2$ absorbents produced according to the present invention are very effective and equivalent to or superior to commercially-available higher-moisture products manufactured according to the prior art. If $CO_2$ sorbents are prepared to the teachings of the "paste process" disclosed in other publications, while formulating the mixture according to the preferred compositions disclosed in the present invention, it is easily seen that unusable products are the result (see Table 2). Direct comparisons may be made between the 10% NaOH/90% Ca(OH)$_2$ and 10% NaOH/10% CaCl$_2$.2H$_2$O/80% Ca(OH)$_2$ products in Tables 1 and 2, paying particular attention to moisture contents.

The dried sorbent data presented in Table 3 clearly illustrates the important role of moisture in $CO_2$ sorbent products. The 5% NaOH/95% Ca(OH)$_2$ sample becomes active after 8 hours of exposure to $CO_2$, while the 10% NaOH/90% Ca(OH)$_2$ product contains sufficient NaOH to generate enough moisture to rapidly activate the main ingredient, Ca(OH)$_2$.

None of the commercial $CO_2$ sorbents are reactive at these very low moisture contents. This may be due to the fact that they typically contain less than 5% NaOH or KOH, or because a hard structure is produced which does not allow $CO_2$ to penetrate the surface of the granules.

Also, the slow activation of the dried "paste process" product, 10% NaOH/10% CaCl$_2$.2H$_2$O/80% Ca(OH)$_2$, may be the result of the presence of CaCl$_2$ which could break the structure of the sorbent enough to allow limited penetration of $CO_2$ and eventual generation of sufficient moisture. The 10% NaOH/90% Ca(OH)$_2$ relative does not become active even after 24 hours and may be impermeable to $CO_2$.

EXAMPLE 5

In order to provide accurate measurements on pressure buildup and absorption of $CO_2$, a rigid vessel such as a glass flask is an ideal container in which to evaluate the carbon dioxide sorbent of the instant invention.

Identical one liter glass flasks fitted with ground joints were each attached to a mercury manometer in conjunction with an all-glass high vacuum system. Freshly roasted and ground Colombian beans were used in this study. The systems were evacuated, and the $CO_2$ release/sorption data recorded as a function of time. As the dark roasted Colombian beans have one of the highest $CO_2$ contents, and to avoid an overflow in the Hg-manometer, the ratio of the void-to-coffee weight in the glass vessels was adjusted to be almost twice as much as that is a flexible bag (680 cc/380 g coffee versus approximately 400 cc/454 g coffee in a bag). In other words, any recorded pressure in the glass system is only half the actual pressure that would occur in a one pound evacuated coffee bag.

Three different sorption systems were evaluated:

Sample A: A mixture of 90% Ca(OH)$_2$ + 10% CaCl$_2$.2H$_2$O (wt/wt)
Sample B: A mixture of 90% Ca(OH)$_2$ + 10% NaOH
Sample C: A mixture of 80% Ca(OH)$_2$ + 10% NaOH + 10% CaCl$_2$.2H$_2$O In all cases, 5 g of each of the above 3 samples was weighed in thimble tubes, and put along with 380 g of the ground beans, in the 1 liter flasks. Each coffee sample was evacuated very quickly with the aid of an efficient oil rotary pump. The systems were then isolated and the increase in headspace pressure was recorded periodically as a function of storage time at ambient temperature (20°–22° C.).

As a control the same ground Colombian coffee was used (380 grams per one liter flask) with no $CO_2$ sorbent. However, due to the high $CO_2$ content of Colombian beans the control sample was allowed to degas in open air for 3 hours after grinding. None of the variant samples were subjected to this extra degassing step, i.e., their entire $CO_2$ contents were released into the evacuated systems and progressively removed by the $CO_2$ sorbents. Table 4 summarizes the build-up of gas pressure in each of the four evacuated coffee systems.

Table 4 shows the relative efficiencies of the three modifications of dry Ca(OH)$_2$ systems in sorbing $CO_2$ at 20°–22° C. The data appears to indicate that the two sorbents containing 10% NaOH (Samples B and C) behaved similarly in removing $CO_2$. These final $CO_2$ pressures are the lowest of all the experiments performed and are well below the pressure that would cause ballooning in an actual coffee bag.

TABLE 4

| Time From Evacuation | Control 3 hr. holdup before vacuum | Sample A 90% Ca(OH)$_2$ 10% CaCl$_2$ | Sample B 90% Ca(OH)$_2$ 10% NaOH | Sample C 80% Ca(OH)$_2$ 10% NaOH 10% CaCl$_2$ |
|---|---|---|---|---|
| 2 minutes | 50 | 15 | 20 | 15 |
| 8 minutes | 80 | — | — | — |
| 22 minutes | 130 | — | — | — |
| 30 minutes | — | 52 | — | 33 |
| 45 minutes | — | — | 25 | — |
| 50 minutes | — | 77 | — | 52 |
| 72 minutes | 223 | — | — | — |
| 85 minutes | — | — | 35 | — |
| 122 minutes | 276 | — | — | — |
| 131 minutes | — | 146 | — | — |
| 187 minutes | 354 | — | 70 | 85 |
| 205 minutes | 349 | 202 | — | — |
| 252 minutes | — | — | — | 110 |
| 4½ hours | — | 238 | 97 | — |
| 5 hours | — | 256 | 114 | 125 |
| 6 hours | — | 275 | — | 138 |
| 6½ hours | — | 291 | — | 150 |
| 1 day | 545 | 431 | — | 268 |
| 3 days | 646 | 525 | — | 342 |
| 4 days | 667 | 542 | — | 350 |
| 5 days | 672 | 549 | — | 354 |
| 10 days | 685 | 549 | 329 | 350 |
| 8 days | 694 | 552 | 334 | 350 |

On the other hand, the control would show an excessive ballooning even though it was degassed for 3 hours prior to the start of this experiment. The data also appears to suggest that the inclusion of $CaCl_2$ is not working as an efficient moisturizer at this particular storage temperature (20°-22° C.) with roasted and ground coffee. This conclusion is evident by comparing Sample A ($CaCl_2$ addition only) and Sample B (NaOH addition only). Sample A would balloon but not as excessively as the control. In other words the inclusion of a small amount of $CaCl_2$ in these sorbents may have enhanced their performance somewhat, but ballooning would still result and the product appearances would be unacceptable for Sample A and the control. The use of $CaCl_2$ is more advantageous in roasted whole bean applications.

EXAMPLE 6

Tests were carried out at 43° C. utilizing a carbon dioxide sorbent which contained no added moisture. In these tests, coffee and the carbon dioxide sorbent were placed together in one liter glass flasks and the pressures monitored. Such a test is designed to show whether the sorbent is satisfactorily removing carbon dioxide liberated from the coffee.

380 grams of Colombian roasted whole beans at 51 roast color was placed in a 1 liter glass flask fitted with a Hg manometer. The beans were brought to 110° F. (43° C.) and eight grams of sorbent in an open thimble tube was inserted and the system closed. The sorbent was composed of 80% wt/wt calcium hydroxide, 10% wt/wt sodium hydroxide and 10% wt/wt calcium chloride dihydrate. During an extended storage period of three months there was no change in pressure. This indicates that all of the carbon dioxide released from the roasted whole beans was removed by the sorbent and that the $CaCl_2 2H_2O$ performed as designed.

EXAMPLE 7

A similar experiment to that described in Example 5 was conducted except that roast and ground coffee was used. Specifically, the same Colombian beans were ground to a regular grind and 380 g was placed in a 1 liter flask equipped with a Hg-manometer. A 5 gram quantity of $CO_2$ sorbent was used in this case (88% wt/wt $Ca(OH)_2$ 12% wt/wt NaOH). A vacuum of about 29 inches was pulled initially and the coffee was allowed to degas at 110° F. for about 12 days. The following is the pressure vs time relationship for that sample.

| Time of Storage at 110° F. | Manometer Reading |
| --- | --- |
| 0.0 | 29" vacuum |
| 17 hours | 24" vacuum |
| 24 hours | 22½" vacuum |
| 41 hours | 22" vacuum |
| 5 days | 20½" vacuum |
| 6 days | 20" vacuum |
| 7 days | 20" vacuum |
| 12 days | 19½" vacuum |

The Table shows that starting with a dry sorbent system, $CO_2$ can still be removed to a great extent. The NaOH initiated the $CO_2$ reaction and the moisture generated activated the dry $Ca(OH)_2$ to react with $CO_2$.

Particularly, this occurred within the critical first 24 hours after packing. At the end of 12 days, the increase in sorbent weight corresponded to 98 cc of $CO_2$ sorbed per each gram after correcting for its measured moisture content.

We claim:

1. A process for packaging roasted coffee which comprises:
   packaging said coffee in a container by either backflushing roasted coffee in a container with nitrogen or vacuum packaging roasted coffee to remove substantially all of the oxygen present therein;
   adding to said container containing said coffee a carbon dioxide sorbent, said carbon dioxide sorbent comprising calcium hydroxide at a level of from 70 to 95% by weight based upon the total dry weight of the sorbent and sodium hydroxide, potassium hydroxide or admixture thereof at a level of from 5 to 15% by weight based upon the total dry weight of the sorbent and 1.5% or less water by weight said sorbent being prepared by dry-blending the calcium hydroxide with the sodium hydroxide, potassium hydroxide or admixture to produce a free-flowing material containing sorbent particles less than 1 mm.

2. The process according to claim 1 wherein said sorbent contains from 5 to 15% sodium hydroxide and from 0% to 0.5% moisture.

3. The process according to claim 1 wherein said sorbent in said container is separately packaged in a carbon dioxide/water permeable membrane which will allow any water generated to be transferred to said coffee to maintain a constant relative humidity throughout the coffee.

4. The process according to claim 1 wherein the carbon dioxide sorbent is present in the packaged roasted coffee at a level of from 1 to 10 grams of the sorbent per pound of the packaged coffee.

5. The process according to claim 1 wherein the roasted coffee is roast and ground coffee.

6. The process according to claim 1 wherein the roasted coffee is roasted whole beans.

7. The process according to claim 1 wherein said roasted coffee has an equilibrium relative humidity of approximately 30%.

8. The process according to claim 7 wherein the roasted coffee contains between 2 to 4% moisture.

9. The process according to claim 1 wherein said carbon dioxide sorbent additionally contains from 5 to 15% calcium chloride by weight based on the total dry weight of the sorbent.

10. The process according to claim 9 wherein said sorbent contains from 5 to 10% calcium chloride.

* * * * *